June 20, 1939.    C. M. HAMBLIN    2,162,714
VIBRATION DAMPENING FITTING
Filed Oct. 8, 1937

INVENTOR
CLYDE M. HAMBLIN
BY
ATTORNEY

Patented June 20, 1939

2,162,714

UNITED STATES PATENT OFFICE 2,162,714.

VIBRATION DAMPENING FITTING

Clyde M. Hamblin, Washington, D. C.

Application October 8, 1937, Serial No. 167,892

1 Claim. (Cl. 248—358)

(Granted under the act of March 3, 1883, as amended April 30, 1928; 370 O. G. 757)

This invention relates to improvements in the design of vibration dampening fittings in which a load is supported by rubber in shear between an interior channel and an exterior channel or angles. In the known types of such fittings the load applied to the top of the fitting causes distortion of the fittings where the base of the fitting rests on a foundation, floor or deck, unless the exterior channel or angles have been secured to the foundation, floor or deck before the load is applied.

The object of this invention is to provide means for preventing such distortion and retaining the exterior channel or angles in the same relative position as when no load is applied.

With the foregoing and other objects in view, the invention consists in the construction, combination and arrangement of parts, as will be described more fully hereafter.

Figure 1:
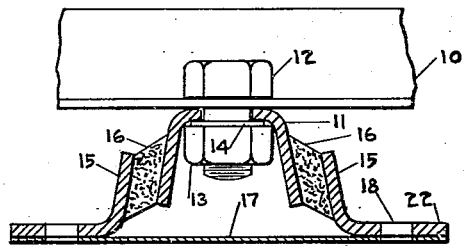
Fig. 1 is a vertical sectional view of a vibration dampening fitting embodying the present invention, taken on line 1—1 of Fig. 2.
Figure 2:
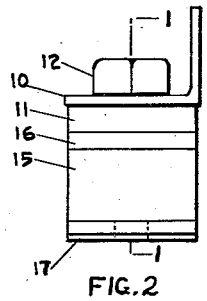
Fig. 2 is a vertical end view of the vibration dampening fitting.

Referring more in detail to the several views of the drawing:

There is shown at 10 the base angle of a fan, pump or other machine resting on the interior or load, bearing member 11 of a vibration dampening fitting and secured thereto by bolt 12, nut 13, and washer 14. The interior or load bearing member 11 of the fitting is permanently secured to the base leg members 15 by elastic material 16 such as rubber. The base members 15 are held in their normal unloaded position by a rigid plate-like tie member 17 welded, riveted or otherwise suitably secured to the outstanding feet 22 of members 15, or formed integral therewith. Holes 18 are provided for securing the vibration dampening fitting together with the load mounted thereon to the supporting surface, such as a foundation, floor or deck.

Figure 3:
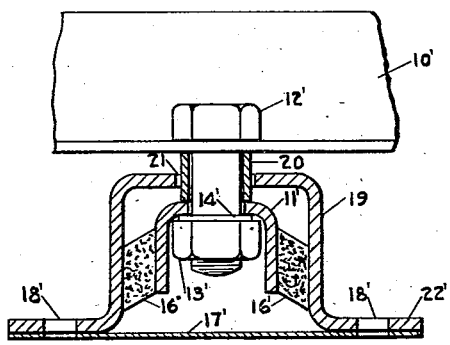
Fig. 3 is a vertical sectional view of a modified form of the vibration dampening fitting, taken on line 2—2 of Fig. 4.
Figure 4:
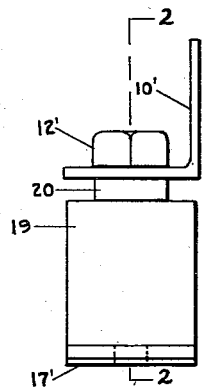
Fig. 4 is a vertical end view of the modified vibration dampening fitting.

In Figs. 3 and 4 the base 10' of the load to be carried is held on the sleeve 20 by a bolt 12' with the washer 14' and nut 13' secured in position on the load bearing member 11', which is permanently secured by the rubber or elastic material 16' to a single continuous member 19. This member 19 is provided with an opening 21 through which the sleeve 20 extends on the load bearing member 11' to the base 10' of the load. The rigid tie member 17' is secured by welding or other suitable means to the bottom of the outstanding feet 22', holes 18' extending through the feet 22' and the rigid tie member 17' for securing the fitting, together with the load mounted thereon, to the supporting surface.

In operation, the fitting is secured to the base of the load by means of the bolt and nut therethrough. The rigid tie member prevents the fitting from being distorted by the weight of the load when it is necessary to support the load thereon during the process of securing the fitting to the supporting surface, thereby assuring that the elasticity of the vibration absorbing medium will be entirely reserved for dampening vibration and not partially wasted through distortion of the fitting.

Other modifications and changes in the proportions and arrangements of the parts may be made by those skilled in the art without departing from the nature and scope of the invention, as defined in the appended claim.

The invention herein described and claimed may be used and/or manufactured by or for the Government of the United States of America for governmental purposes without the payment of any royalties thereon or therefor.

Having thus set forth and disclosed the nature of this invention, what is claimed is:

In a vibration absorption device of the type having a central load bearing member and a plurality of individual legs joined to the load bearing member by a vibration absorption means vulcanized therebetween, means forming a permanent part of said device for holding said legs against lateral displacement relative to each other while the load is being applied to the load bearing member, said means comprising a rigid plate-like tie member permanently secured to each individual leg, whereby said legs are held at a fixed lateral distance from each other at all times, whether loaded or unloaded.

CLYDE M. HAMBLIN.